Jan. 28, 1969 A. LEGER, JR 3,424,921
ELECTRICAL APPARATUS
Filed Jan. 12, 1965
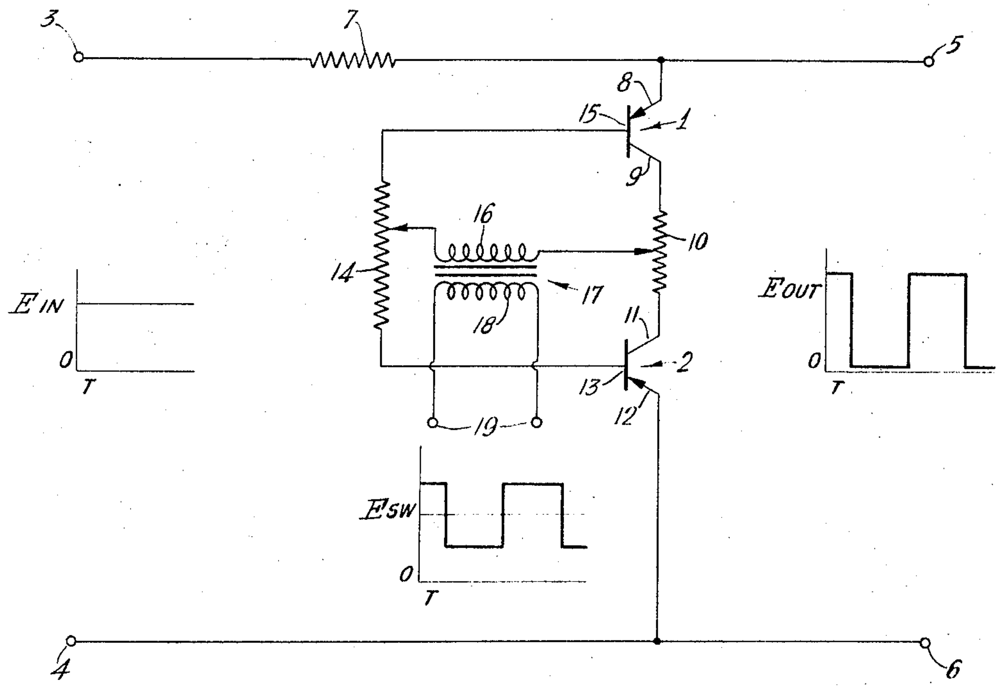
INVENTOR.
ALTON LEGER JR.
BY Arthur H. Swanson
ATTORNEY Patented Jan. 28, 1969

1

3,424,921
ELECTRICAL APPARATUS

Alton Leger, Jr., Roslyn, Pa., assignor to Honeywell Inc., a corporation of Delaware
Filed Jan. 12, 1965, Ser. No. 424,923
U.S. Cl. 307—240 3 Claims
Int. Cl. H03k 17/14, 17/60

The present invention relates to electrical switches. More specifically, the present invention relates to semiconductor switch apparatus.

An object of the present invention is to provide an improved semi-conductor switch device.

Another object of the present invention is to provide an improved semi-conductor switch using two transistors.

A further object of the present invention is to provide an improved transistor switch for handling low-magnitude input signals.

Still another object of the present invention is to provide an improved two transistor switch having a novel temperature compensating circuit for balancing the transistor operation between conducting and non-conducting states.

In accomplishing these and other objects, there has been provided, in accordance with the present invention, a transistor switch having a pair of transistors arranged to provide an emitter-collector path through a series connection of both transistors. A switch driving signal is simultaneously applied to both of the transistors to concurrently switch them between a conducting and a nonconducting state. A pair of potentiometers are provided in the switch circuit to compensate, respectively, the internal voltage drops of the transistors in the off-state and the effect of the switching signal in the on state whereby the switch circuit is made independent of environmental temperature.

A better understanding of the present invention may be had when the following detailed description is read in connection with the accompanying single figure drawing, in which there is shown a schematic representation of a transistor switch embodying the present invention.

Referring to the single drawing in more detail, there is shown a transistor switch comprising a first transistor 1 and a second transistor 2. A pair of input terminals 3 and 4 are connected to a pair of output terminals 5 and 6 respectively. Specifically, the input terminal 3 is connected through a resistor 7 to the output terminal 5, while the input terminal 4 is connected directly to the output terminal 6.

An emitter 8 of the first transistor 1 is, also, connected to the output terminal 5. The collector 9 of the transistor 1 is connected through the resistance element of a first potentiometer 10 to the collector 11 of the transistor 2. An emitter 12 of the transistor 2 is connected to the other output terminal 6. The base 13 of the transistor 2 is connected through the resistance element of a second potentiometer 14 to the base 15 of the transistor 1.

The slider of the first potentiometer 10 is connected through a secondary winding 16 of a transformer 17 to the slider of the second potentiometer 14. A primary winding 18 of the transformer 17 is connected to a pair of switching signal terminals 19 for connection to a source of an energizing signal for the transistor switch.

In operation, the switch of the present invention is effective to convert the steady direct-current input signal applied to the input terminals 3 and 4 to an alternating, or chopped, output signal on the output terminals 5 and 6. The switch transistors 1 and 2 are alternately-concurrently switched between a conducting and non-conducting state with respect to the emitter-to-collector paths thereof. Thus the switch of the present inventon is effective to constate, the input terminal 3 is conductively coupled to

2 input terminal 4 through the current-limiting resistor 7 and the emitter-collector paths of the transistors 1 and 2. Further, output terminal 5 is substantially short-circuited to output terminal 6. When the transistors 1 and 2 are in a non-conducting state, the input signal on the input terminals 3 and 4 appears on the output terminals 5 and 6. Thus, the switch of the present invention is effective to convert the direct-current input signal to an alternating signal having a frequency which is dependent on the frequency of transition of the switch between its conducting and nonconducting states. This method of operation is only one use of the present invention which may be used in other configuration without departing from the spirit of this invention. This transition of the switch is controlled by an alternating-current switching signal applied to the terminals 19. The switching signal is transferred through the transformer 17 and is applied to the base and collector electrodes of both of the transistors 1 and 2. One polarity of the switching signal is effective to turn on the transistors 1 an 2 while the other polarity is effective to turn them off. For example, as shown in the single figure, the transistors 1 and 2 are pnp transistors so that a negative polarity applied to the collectors will turn the transistors on by inducing a current-conducting state.

When the transistors 1 and 2 are in a non-conducting state, it can be shown that a voltage difference must exist between emitter terminals 8 and 12 for an undesired external current to flow from the transistor switch. Since the base electrodes 13 and 15 of transistors 1 and 2 are effectively tied together, any voltage across the emitter electrodes 8 and 12 must be the result of unequal internal voltage across the respective emitter to base electrodes. One of the components of these voltages is the PN junction barrier voltage Θ, and the voltage drop across the bulk resistivity or the base wafer produced by the collector current in the off-state $I_{co}$. It is to be noted that the $I_{co} \times R_b$ voltage drop is highly temperature dependent and it may amount to 199 microvolts or more. Accordingly, a difference between the transistors 1 and 2 would give rise to an error, or offset, of appreciable magnitude. A difference between the transistors 1 and 2 in either of these voltages will result in a measurable current from the switch and will produce an error from a true off state. The potentiometer 14 is provided to balance the internal voltages and reduce the aforesaid error. The potentiometer 14 is adjusted during the off state of transistors 1 and 2 so that there is no voltage difference between emitters 8 and 12; i.e., voltage drop produced by the $I_{co}$ of transistor 1 flowing through a respective part of potentiometer 14 between the slider and base electrode 15 is equal to the voltage drop produced by the $I_{co}$ of transistor 2 flowing through potentiometer 14 between the slider and base electrode 13. Since the respective parts of potentiometer 14 are in series with the respective base resistances, the aforesaid balance is independent of $I_{co}$ and thus, is effective to make the off-state of the switch independent of temperature variations of the switch environment.

In the on state of the transistors 1 and 2, the setting of the potentiometer 14 will affect the relative magnitudes of the base drive signals for the transistors 1 and 2 as supplied from the secondary winding 16. The potentiometer 10 is provided between the collector electrodes 9 and 11 to offset this effect of the potentiometer 14. Thus, the setting of potentiometer 10 is adjusted to insure that the difference in base drive signals occasioned by the initial setting of potentiometer 14 is offset by introducing compensating resistances in the current paths of the base drive currents. The resistance value of potentiometer 10 is made small with respect to potentiometer 14 so that potentiometer 10 will have a negligible effect on the off-state of transistors 1 and 2 as a result of $I_{co}$'s flowing therethrough.

Accordingly, it may be seen that there has been provided, in accordance with the present invention, a transistor switch for selectively providing a conducting path while having means for compensating the switch to produce a temperature independent of the switch operation.

What is claimed is:

1. An electrical switch comprising a pair of semi-conductive means, switch energizing means arranged to selectively bias said pair of semi-conductor means in a current-conducting state, and switch circuit balance means connected between said energizing means and said semi-conductor means and operative to provide a simultaneous balance of the respective effects of a current flowing through each of said semi-conductor means in a substantially non-conductive state whereby to provide a temperature stabilized switch condition.

2. An electrical switch as set forth in claim 1 wherein said balance means includes means to simultaneously balance the operation of the semi-conductive means in a conductive state separately from said non-conductive state.

3. An electrical switch comprising a pair of transistors, each of said transistors having a control electrode, and input electrode and an output electrode, a first potentiometer having its resistance element connected between an output electrode of a first one of said transistors and an output electrode of a second one of said transistors, a second potentiometer having its resistance element connected between said control electrode of said first one of said transistors and said control electrode of said second one of said transistors, switch energizing means connected between a slider of said first potentiometer and a slider of said first potentiometer and a slider of said second potentiometer, and switch input and output means connected across an input electrode of said first transistor and an input electrode of said second transistor whereby to provide a temperature stabilized switch operation.

References Cited

UNITED STATES PATENTS

| | | | |
|---|---|---|---|
| 3,188,576 | 6/1965 | Lewis | 307—310 |
| 3,241,013 | 3/1966 | Evans | 307—240 |
| 3,309,527 | 3/1967 | Walker | 307—240 |
| 3,330,969 | 7/1967 | Loyen | 307—240 |

ARTHUR GAUSS, *Primary Examiner.*

ROBERT H. PLOTKIN, *Assistant Examiner.*

U.S. Cl. X.R.

307—310

UNITED STATES PATENT OFFICE

CERTIFICATE OF CORRECTION

Patent No. 3,424,921 January 28, 1969

Alton Leger, Jr.

It is certified that error appears in the above identified patent and that said Letters Patent are hereby corrected as shown below:

Column 4, line 7, cancel "a slider of said first potentiometer and".

Signed and sealed this 10th day of February 1970.

(SEAL)
Attest:

Edward M. Fletcher, Jr.
Attesting Officer

WILLIAM E. SCHUYLER, JR.
Commissioner of Patents